United States Patent [19]

Hergenrother et al.

[11] Patent Number: 5,238,893

[45] Date of Patent: Aug. 24, 1993

[54] METHOD OF PREPARING AN ANIONIC POLYMERIZATION INITIATOR

[75] Inventors: William L. Hergenrother, Akron; John M. Doshak, Mogadore, both of Ohio

[73] Assignee: Bridgestone Corporation, Tokyo, Japan

[21] Appl. No.: 814,131

[22] Filed: Dec. 30, 1991

[51] Int. Cl.⁵ ............................................. C08F 4/48
[52] U.S. Cl. .................................. 502/155; 502/157; 526/173; 526/180; 260/665 R
[58] Field of Search ............... 564/305, 442; 526/180, 526/173; 260/665 R; 502/155, 157

[56] References Cited

U.S. PATENT DOCUMENTS

| | | | |
|---|---|---|---|
| 3,177,190 | 4/1965 | Hsieh | 260/94.2 |
| 3,317,918 | 5/1967 | Foster | 260/83.7 |
| 3,393,182 | 7/1968 | Trepka | 260/79.5 |
| 3,426,006 | 2/1969 | Nützel et al. | 260/83.5 |
| 3,439,049 | 4/1969 | Trepka | 260/624 |
| 3,856,877 | 12/1974 | Otsuki et al. | 260/677 |
| 4,015,061 | 3/1977 | Schulz et al. | 526/178 |
| 4,026,865 | 5/1977 | Uraneck et al. | 260/42.32 |
| 4,085,265 | 4/1978 | Otsuki et al. | 526/49 |
| 4,247,418 | 1/1981 | Halasa et al. | 252/431 |
| 4,414,372 | 11/1983 | Farnham et al. | 526/190 |
| 4,429,091 | 1/1984 | Hall | 526/181 |
| 4,476,240 | 10/1984 | Hall et al. | 502/155 |
| 4,478,953 | 10/1984 | Yuki et al. | 502/155 |
| 4,614,771 | 9/1986 | Watanabe et al. | 525/351 |
| 4,616,069 | 10/1986 | Watanabe et al. | 525/370 |
| 4,736,003 | 4/1988 | Schneider et al. | 526/190 |
| 4,894,409 | 1/1990 | Shimada et al. | 524/492 |
| 4,914,147 | 4/1990 | Mouri et al. | 524/495 |

FOREIGN PATENT DOCUMENTS

| | | |
|---|---|---|
| 0067111 | 12/1982 | European Pat. Off. . |
| 0264506 | 4/1988 | European Pat. Off. . |
| 0282437 | 9/1988 | European Pat. Off. . |
| 0290883 | 11/1988 | European Pat. Off. . |
| 0316255 | 5/1989 | European Pat. Off. . |
| 247455 | 7/1987 | German Democratic Rep. . |
| 2117778 | 10/1983 | United Kingdom . |

OTHER PUBLICATIONS

Gilman et al., "Halogen-Metal Interconversion with m- and p-Bromodimethylanilines", JACS, 62, 344 (1940).

"Preparation of Some Trialkyl Tin-Lithium Compounds", J. Am. Chem. Soc., 75, 2507-2508, (1953) Gillman et al.

"Preparation and Reactions of Trialkyl Tin Lithium", J. Org. Chem., 28, 237 (1963) Tamborski et al.

"Some Reactions of Tributyl- and Triphenyl-Stannyl Derivatives of Alkali Metals", J. Chem. Soc., 618-622 (1961) Blake.

(List continued on next page.)

Primary Examiner—Fred Teskin
Attorney, Agent, or Firm—Daniel N. Hall

[57] ABSTRACT

A vulcanizable elastomeric compound and products such as pneumatic tires and the like, are formed from a functionalized polymer having a functional group derived from the polymerization initiator. The polymerization initiator is selected from the group consisting of

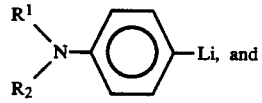

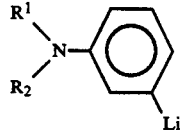

where $R^1$ and $R^2$ are the same or different and are selected from the group consisting of alkyls having from 1 to about 12 carbon atoms, cycloalkyls having from 3 to about 14 carbon atoms, and aryls having from 6 to about 20 carbon atoms. Methods of the present invention include preparing the initiator, preparing functionalized polymers and, reducing the hysteresis of vulcanizable elastomeric compounds.

8 Claims, No Drawings

OTHER PUBLICATIONS

"New Perfectly Difunctional Organolithium Initiators for Block Copolymer Synthesis: Synthesis of Dilithium Initiators in the Absence of Polar Additives", *Polymer*, vol. 22, 1724 (Dec. 1981) Guyot et al.

"A Bifunctional Anionic Initiator Soluble in Non-Polar Solvents", Makromol. Chem., 179, pp. 551-555, (1978) Beinert et al.

"Bifunctional Anionic Initiators: A Critical Study and Overview", Makromol. Chem., 186, pp. 2017-2024, (1985) Bandermann et al.

"Anionic Polymerization Initiators Containing Protected Functional Groups", Journal of Polymer Science, vol. 15, pp. 2401-2410, (1977) Schultz et al.

"Specific Functionalization of Polymers by Carboxyl Groups", Makromol. Chem., 179, pp. 1383-1386 (1978) Broze et al.

"3-Dimethylaminopropyl-Lithium—An Analytical and Kinetic Investigation of a New Initiator System for Polymer Synthesis", European Polymer Journal, vol. 11, 699-704, (1975) Eisenbach et al.

"Anionic Polymerization Initiators Containing Protected Functional Groups and Functionally Terminated Diene Polymers", *Journal of Polymer Science*, Polymer Chemistry Edition, vol. 12, 153-166 (1974) Schultz et al.

"Studies of the Anionic Polymerization of Phenyl Vinyl Sulfoxide and Its Copolymer with Styrene", *Macromolecules*, 23, 4235-4240, (1990) Kanga.

"Thermal Elimination of Poly(phenyl vinyl sulfoxide) and Its Polystyrene Block Copolymers", *Macromolecules*, 23, 4241-4246, (1990) Kanga.

"Anionic Polymerization Initiated by Diethylene in Organic Solvents", Journal of Polymer Science, vol. 11, p. 2777 (1973) Angood et al.

"Anionic Polymerization", American Chemical Society Symposium Series 166, p. 513 (1981), Cheng.

"An Improved Synthesis of p-Dimethylaminophenyl-Lithium", Chem. and Ind. May 1969.

"Polymerization of Unsaturated Compounds in the Presence of Lithium Diethylamide", Vinogradov et al, *Polymer Science USSR*, vol. 4, 1963.

*Chemical Abstracts*, vol. 91, No. 12, Sep. 1979, Chiba et al.

METHOD OF PREPARING AN ANIONIC POLYMERIZATION INITIATOR

TECHNICAL FIELD

The subject invention relates to the anionic polymerization of diene polymer and copolymer elastomers. More specifically, the present invention relates to anionic polymerization employing a phenylamine initiator compound.

Diene polymers and copolymers prepared according to the present invention, have reduced hysteresis characteristics. Articles such as tires, power belts and the like which are prepared from these polymers exhibit increased rebound, decreased rolling resistance and less heat built-up during mechanical stress operations.

BACKGROUND OF THE INVENTION

In the art it is desirable to produce elastomeric compounds exhibiting reduced hysteresis. Such elastomers, when compounded to form articles such as tires, power belts and the like, will show an increase in rebound, a decreased rolling resistance and will have less heat build-up when mechanical stresses are applied.

Previous attempts at preparing reduced hysteresis products have included high temperature mixing of the filler-rubber mixtures in the presence of selectively-reactive promoters to promote compounding material reinforcement; surface oxidation of the compounding materials; chemical modifications to the terminal end of polymers using tetramethydiaminobenzophenone (Michler's ketone), tin coupling agents and the like and, surface grafting thereon. All of these approaches have focused upon increased interaction between the elastomer and the compounding materials.

It has also been recognized that carbon black, employed as a reinforcing filler in rubber compounds, should be well dispersed throughout the rubber in order to improve various physical properties. One example of the recognition is provided in published European Pat. Appln. EP 0 316 255 A2 which discloses a process for end capping polydienes by reacting a metal terminated polydiene with a capping agent such as a halogenated nitrile, a heterocyclic aromatic nitrogen-containing compound or an alkyl benzoate. Additionally, the application discloses that both ends of the polydiene chains can be capped with polar groups by utilizing functionalized initiators, such as lithium amides.

The present invention provides novel initiators for anionic polymerization which become incorporated into the polymer chain providing a functional group which greatly improves the dispersability of carbon black throughout the elastomeric composition during compounding. As will be described hereinbelow, these initiators are compounds containing a phenylamine group.

Organolithium polymerization initiators are also known in the art. U.S. Pat. No. 3,439,049, owned by the Assignee of record, discloses an organolithium initiator prepared from a halophenol in a hydrocarbon medium.

U.S. Pat. No. 4,015,061 is directed toward amino-functional initiators which polymerize diene monomers to form mono- or di-primary aryl amine-terminated diene polymers upon acid hydrolysis.

U.S. Pat. No. 4,914,147 discloses terminal modifying agents including dialkylamino-substituted aromatic vinyl compounds such as N,N'-dimethylamino benzophenone and p-dimethylamino styrene, in rubber compositions having reduced hysteresis characteristics. In U.S. Pat. No. 4,894,409, an amino group-containing monomer, such as 2-N,N-dimethylaminostyrene is polymerized to form an amino group-containing diene based polymer.

As will become apparent subsequently, p-dimethylaminophenyl-lithium is employed in the present invention as a polymerization initiator. This compound is known as a reagent in the synthesis of dye-bases. The compound and a method for the synthesis thereof are described in the publication "An improved synthesis of p-dimethylaminophenyl-lithium" by G. Hallas et al., p 620, Chemistry and Industry, (1969).

Thus, the foregoing art has not employed an organolithium polymerization initiator for the incorporation of a phenylamino functional group into the polymer chain with a lithium atom at the opposite end prior to quenching.

SUMMARY OF INVENTION

It is therefore an object of the present invention to provide anionic polymerization initiators which promote the incorporation of functional, active groups in the polymer chain.

It is another object of the present invention to provide a method of preparing an anionic polymerization initiator.

It is another object of the present invention to provide functionalized polymers having active terminal groups.

It is another object of the present invention to provide a method for preparing functionalized polymers having active terminal groups.

It is still another object of the present invention is to provide a method for the preparation of a functionalized polymer.

It is yet another object of the present invention is to provide a method for reducing the hysteresis of elastomeric vulcanizable compounds.

It is another object of the present invention to provide vulcanizable elastomeric compounds having reduced hysteresis.

It is still another object of the present invention to provide an improved pneumatic tire having decreased rolling resistance.

At least one or more of the foregoing objects together with the advantages thereof over the existing art, which shall become apparent from the specification which follows, are accomplished by the invention as hereinafter described and claimed.

In general the present invention provides a functionalized polymer which comprises a polymer chain carrying a functional group at one end of the chain and a lithium atom at the other end of the chain prior to quenching. The functional group is selected from the group consisting of

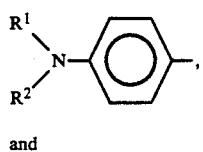

and

-continued

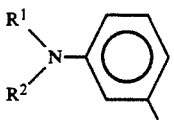

where $R^1$ and $R^2$ are the same or different and are selected from the group consisting of alkyls having from 1 to about 12 carbon atoms, cycloalkyls having from 3 to about 14 carbon atoms, and aryls having from 6 to about 20 carbon atoms.

There is also provided according to the present invention, a functionalized polymer of the type formed by the polymerization of at least one anionically polymerizable monomer, and improved with respect to its hysteresis properties. The the improvement comprises polymerizing at least one monomer in the presence of a polymerization initiator selected from the group consisting of

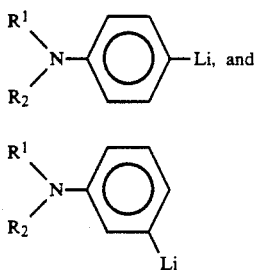

where $R^1$ and $R^2$ are the same or different and are selected from the group consisting of alkyls having from 1 to about 12 carbon atoms, cycloalkyls having from 3 to about 14 carbon atoms, and aryls having from 6 to about 20 carbon atoms.

A method of preparing a functionalized polymer according to the present invention comprises the steps of forming a solution of one or more anionically polymerizable monomers in a solvent; and, polymerizing the monomers in the presence of an initiator compound. The initiator compound is selected from the group consisting of

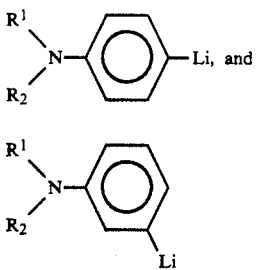

where $R^1$ and $R^2$ are the same or different and are selected from the group consisting of alkyls having from 1 to about 12 carbon atoms, cycloalkyls having from 3 to about 14 carbon atoms, and aryls having from 6 to about 20 carbon atoms.

Also according to the present invention, a vulcanizable elastomeric compound having reduced hysteresis properties comprises an elastomeric polymer having a plurality of chains. Substantially each chain carries a functional group at the initiator end of the chain and a lithium atom at the other end of the chain prior to quenching. The functional group is selected from the group consisting of

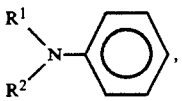

and

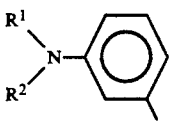

where $R^1$ and $R^2$ are the same or different and are selected from the group consisting of alkyls having from 1 to about 12 carbon atoms, cycloalkyls having from 3 to about 14 carbon atoms, and aryls having from 6 to about 20 carbon atoms. The vulcanizable elastomeric compound also comprises from about 5 to about 80 parts by weight of carbon black, per 100 parts by weight of the elastomeric polymer.

Further according to the present invention, an improved tire having decreased rolling resistance resulting from a treadstock containing a vulcanizable elastomeric composition comprises an elastomeric polymer having a plurality of chains. Substantially each chain carries a functional group at the initiator end of the chain and a lithium atom at the other end of the chain prior to quenching. The functional group is selected from the group consisting of

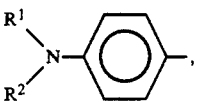

and

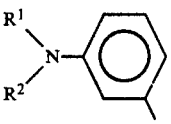

where $R^1$ and $R^2$ are the same or different and are selected from the group consisting of alkyls having from 1 to about 12 carbon atoms, cycloalkyls having from 3 to about 14 carbon atoms, and aryls having from 6 to about 20 carbon atoms. The vulcanizable elastomeric compound also comprises from about 5 to about 80 parts by weight of carbon black, per 100 parts by weight of the elastomeric polymer.

A method of preparing an anionic polymerization initiator according to the present invention, comprises the step of reacting an organolithium compound with a phenylamine compound selected from the group consisting of

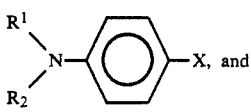

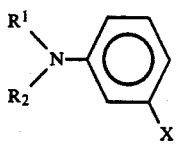

where $R^1$ and $R^2$ are the same or different and are selected from the group consisting of alkyls having from 1 to about 12 carbon atoms, cycloalkyls having from 3 to about 14 carbon atoms, and aryls having from 6 to about 20 carbon atoms; and X is a halogen, wherein X is replaced by a lithium atom.

Finally, a method for reducing the hysteresis of vulcanizable elastomeric compounds comprising the steps of polymerizing one or more anionically polymerizable monomers in the presence of an initiator selected from the group consisting of

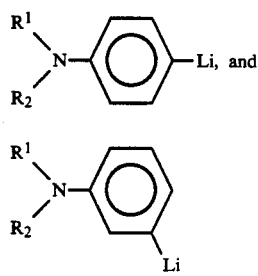

where $R^1$ and $R^2$ are the same or different and are selected from the group consisting of alkyls having from 1 to about 12 carbon atoms, cycloalkyls having from 3 to about 14 carbon atoms, and aryls having from 6 to about 20 carbon atoms; quenching the polymerization to form an elastomer; and adding from about 5 to 80 parts by weight of carbon black, per 100 parts of the elastomer to form a blend of the vulcanizable elastomeric composition.

PREFERRED MODE FOR CARRYING OUT THE INVENTION

As will become apparent from the description which follows, the present invention provides a novel initiator for anionic polymerization of diene homopolymer and copolymer elastomers. Polymers prepared with these initiators contain a functional terminal group, and it has been discovered herein that vulcanizable elastomeric compounds and articles thereof based upon such functionally terminated polymers exhibit useful properties, particularly, reduced hysteresis. When compounded to make products such as tires, power belts and the like, these polymeric products exhibit increased rebound, decreased rolling resistance and less heat build-up during periods of applied mechanical stress.

The initiators according to the present invention are phenylamine-containing compounds. More particularly, the initiators according to the present invention have one or the other of the following general formulas:

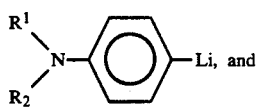

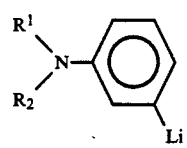

where $R^1$ and $R^2$ are the same or different and can be, for example, alkyls having from 1 to about 12 carbon atoms, cycloalkyls having from 3 to about 14 carbon atoms, and aryls having from 6 to about 20 carbon atoms. One preferred initiator according to the present invention is 4-dimethylamino phenyl lithium.

The initiators according to the present invention are preferably the reaction product of an organolithium compound and a phenylamine compound. One preferred class of organolithium compounds has the general formula RLi, where R is selected from the group consisting of alkyls, cycloalkyls, alkenyls, alkynyls, aryls and aralkyls having from about 1 to about 20 carbon atoms and short chain length low molecular weight polymers from diolefin and vinyl aryl monomers having up to about 25 units. Typical alkyls include n-butyl, s-butyl, methyl, ethyl, isopropyl and the like. The cycloalkyls include cyclohexyl, menthyl and the like. The alkenyls include allyl, vinyl and the like. The aryl and aralkyl groups include phenyl, benzyl, oligo(styryl) and the like. Exemplary short chain length polymers include the oligo(butadienyls), oligo(isoprenyls), oligo(styryls) and the like.

The organolithium compound is reacted with a phenylamine compound, such as one of those having the following general structure:

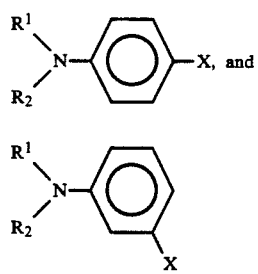

where $R^1$ and $R^2$ are as defined hereinabove, and X is a halogen, preferably bromine. One preferred phenylamine compound is 4-bromo dimethylaniline.

The initiator according to the present invention can be prepared by forming a solution of the phenylamine compound in an anhydrous, aprotic solvent, such as toluene or hexane. To this solution is then added the organolithium compound (RLi) in the same or a similar solvent. Both are allowed to react for approximately one to 24 hours at ambient temperature (25° to 30° C.), followed by filtering or decanting to remove the precipitated lithium phenylamine compound. The precipitate is then dissolved in tetrahydofuran (THF). Amounts of the two reactants range from about 0.9 to about 1.1 mmoles of the phenylamine compound to 1 mmole of organolithium compound, with equimolar parts being preferred. It is to be appreciated by one skilled in the art that various reaction temperatures and times may be useful and are within the scope of the present invention. Furthermore, other polar aprotic solvents such a tertiary amines and ethers may be added to give a soluble catalyst. With proper agitation, the fine powdered precipitate can be dispersed in a hydrocarbon for subsequent use.

The initiator thus prepared, is employed to prepare any anionically-polymerized elastomer, e.g., polybutadiene, polyisoprene and the like, and copolymers thereof with monovinyl aromatics such as styrene, alpha methyl styrene and the like, or trienes such as myrcene. Thus, the elastomers include diene homopolymers, A and copolymers thereof with monovinyl aromatic polymers, B. Exemplary diene homopolymers are those prepared from diolefin monomers having from 4 to about 12 carbon atoms. Exemplary vinyl aromatic polymers are those prepared from monomers having from 8 to about 20 carbon atoms. Preferred elastomers include diene homopolymers such as polybutadiene and polyisoprene and copolymers such a styrene butadiene rubber (SBR). Copolymers can comprise from about 99 to 20 percent by weight of diene units and from about 1 to about 80 percent by weight of monovinyl aromatic or triene units, totalling 100 percent. The polymers and copolymers of the present invention may have 1,2-microstructure contents ranging from about 10 to about 80 percent, with the preferred polymers or copolymers having 1,2-microstructure contents of from about 25 to 65 percent, based upon the diene content.

The copolymers are preferably random copolymers which result from simultaneous copolymerization of the monomers forming the A and B polymers, as is known in the art. The block copolymers, poly (b-B-b-A-b-B), result from the separate polymerization of the monomers forming the A and B polymers as is known in the art. Such block copolymers which include poly(b-styrene-b-butadiene-b-styrene) are thermoplastic elastomers.

The initiators of the present invention form "living polymers" from the foregoing monomers, the general formula prior to quenching of which is

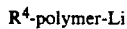

where the polymer is any of the foregoing diene homopolymers, monovinyl aromatic homopolymers, diene-/monovinyl aromatic random copolymers and block copolymers and $R^4$ is a functional group derived from the initiator. For example, $R^4$ may be one of the following:

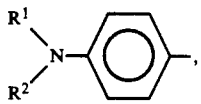

and

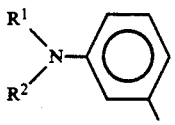

where $R^1$ and $R^2$ are as defined hereinabove. The lithium proceeds to move down the growing chain as polymerization continues, until the reaction is quenched.

Polymerization is usually conducted in a conventional solvent for anionic polymerizations such as hexane, cyclohexane, benzene and the like. Other techniques for polymerization, such as semi-batch and continuous polymerization may be employed. In order to promote randomization in copolymerization and to increase vinyl content, a polar coordinator may optionally be added to the polymerization ingredients. Amounts range between 0 to 90 or more equivalents per equivalent of lithium. The amount depends upon the type of polar coordinator that is employed, the amount of vinyl desired, the level of styrene employed and the temperature of the polymerizations, as well as the selected initiator.

Compounds useful as polar coordinators are organic and include tetrahydrofuran, linear and cyclic oligomeric oxolanyl alkanes such as 2-2'-di(tetrahydrofuryl) propane, di-piperidyl ethane, hexamethylphosphoramide, N-N'-dimethylpiperazine, diazabicyclooctane, dimethyl ether, diethyl ether, tributylamine and the like. The linear and cyclic oligomeric oxolanyl alkane polar coordinators are described in U.S. Pat. No. 4,429,091, owned by the Assignee of record, the subject matter of which is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA).

Polymerization is begun by charging a blend of the monomer(s) and solvent to a suitable reaction vessel, followed by the addition of the polar coordinator and the initiator solution previously described. The procedure is carried out under anhydrous, anaerobic conditions. The reactants are heated to a temperature of from about 30° to 120° C. and are agitated for about 0.15 to 24 hours. After polymerization is complete, the product is removed from the heat and terminated in one or more ways.

For example, a protic quenching agent may be employed to give a monofunctional polymer chain. Quenching may be conducted in water, steam or an alcohol such as isopropanol, or any other suitable method. Quenching may also be conducted with a functional terminating agent, resulting in a difunctional polymer. Compounds providing terminal functionality (i.e., "endcapping") can be used such as tin tetrachloride, $R^5{}_{(3)}SnCl, R^5{}_{(2)}SnCl_2, R^5SnCl_3$, carbodiimides, N-substituted cyclic amides, N,N' disubstituted cyclic ureas, cyclic amides, cyclic ureas, isocyanates, Schiff bases, 4,4'-bis(diethylamino) benzophenone, and the like. The organic moiety $R^5$ is selected from the group consisting of alkyls having from about 1 to about 20 carbon atoms, cycloalkyls having from about 3 to about 20 carbon atoms, aryls having from about 6 to about 20 carbon atoms and aralkyls having from about 7 to about 20 carbon atoms. Typical alkyls include n-butyl, s-butyl, methyl, ethyl, isopropyl and the like. The cycloalkyls include cyclohexyl, menthyl and the like. The aryl and aralkyl groups include phenyl, benzyl and the like. Preferred endcapping agents are selected from the group consisting of tin tetrachloride, tributyl tin chloride, dibutyl tin dichloride and N,N'-dimethylethyleneurea. The terminating agent is added to the reaction vessel, and the vessel is agitated for about 1 to about 1000 minutes. Further examples of terminating agents include the terminators described in copending application Ser. No. 07/506,305, and U.S. Pat. No. 5,066,729, the subject matter of which is incorporated by reference herein. It is to be understood that practice of the present invention is not limited solely to these terminators inasmuch as other compounds that are reactive with the polymer bound carbon-lithium moiety can be selected to provide a desired functional group.

Quenching is usually conducted by stirring the polymer and quenching agent for about 0.05 to about 2 hours at temperatures of from about 30° to 120° C. to ensure complete reaction. Polymers terminated with a functional group as discussed hereinabove, are subsequently quenched with alcohol or other quenching agent as described hereinabove.

Lastly, the solvent is removed from the polymer by drum drying, extruder drying, vacuum drying or the like, which may be combined with coagulation with water, alcohol or steam. If coagulation with water or steam is used, oven drying may be desirable.

The polymers of the present invention contain a functional group at the head of the polymer chain in addition to an optional functionality at the terminal end of the chain. These functional groups have an affinity for compounding materials such as silica or carbon black. Such compounding results in products exhibiting reduced hysteresis, which means a product having increased rebound, decreased rolling resistance and has lessened heat build-up when subjected to mechanical stress. Products including tires, power belts and the like are envisioned. Decreased rolling resistance is, of course, a useful property for pneumatic tires, both radial as well as bias ply types and thus, the vulcanizable elastomeric compositions of the present invention can be utilized to form treadstocks for such tires.

The polymers of the present invention can be utilized as 100 parts of the rubber in the treadstock compound or, they can be blended with any conventionally employed treadstock rubber which includes natural rubber, synthetic rubber and blends thereof. When the polymers of the present invention are blended with conventional rubbers, the amounts can vary widely with a lower limit comprising about 10 to 20 percent by weight of the total rubber. It is to be appreciated that the minimum amount will depend primarily upon the degree of reduced hysteresis that is desired.

The polymers can be compounded with all forms of carbon black in amounts ranging from about 5 to 80 parts by weight, per 100 parts of rubber (phr), with about 35 to 60 phr being preferred. The carbon blacks may include any of the commonly available, commercially-produced carbon blacks but those having a surface area (EMSA) of at least 20 m²/gram and more preferably at least 35 m²/gram up to 200 m²/gram or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the TABLE I hereinbelow.

TABLE I

| Carbon Blacks | |
|---|---|
| ASTM Designation (D-1765-82a) | Surface Area (m²/g) (D-3765) |
| N-110 | 126 |
| N-220 | 111 |
| N-339 | 95 |
| N-330 | 83 |
| N-550 | 42 |
| N-660 | 35 |

The carbon blacks utilized in the preparation of the rubber compounds of the invention may be in pelletized form or an unpelletized flocculent mass. Preferably, for more uniform mixing, unpelletized carbon black is preferred.

The reinforced rubber compounds can be cured in a conventional manner with known vulcanizing agents at about 0.1 to 10 phr. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents can be used alone or in combination.

Vulcanizable elastomeric compositions of the invention can be prepared by compounding or mixing the functionalized polymers herein with carbon black and other conventional rubber additives including for example, fillers, such as silica, plasticizers, antioxidants, curing agents and the like using standard rubber mixing equipment and procedures. Such elastomeric compositions when vulcanized using conventional rubber vulcanization conditions have reduced hysteresis properties and are particularly adapted for use as tread rubbers for tires having reduced rolling resistance.

GENERAL EXPERIMENTAL

In order to demonstrate the preparation and properties of elastomers prepared according to the present invention, a phenylamine initiator was prepared by reacting 4-bromo dimethylaniline with n-butyl lithium to form 4-dimethylamino phenyl lithium. The initiator was used to polymerize a butadiene polymer, as well as a butadiene/styrene polymer, a portion of which was terminated with tributyl tin chloride. For comparison, a control polybutadiene polymer was prepared employing n-butyl lithium as the initiator. As noted above, various techniques known in the art for carrying out polymerizations may be used with these initiators without departing from the scope of the present invention.

INITIATOR PREPARATION

Into a suitable bottle there was charged 5.6 grams (0.028 moles) of 4-bromo dimethylaniline in 52 milliliters (ml) of dry toluene, and 18.2 cubic centimeters (cc) (0.028 moles) of n-butyl lithium dissolved in hexane. Upon standing, a white precipitate formed which was separated from the remaining liquid. Dry THF was added to give a total volume of 50 ml.

EXAMPLE NO. 1

About 100 grams of butadiene were dissolved in 300 grams of hexane. To this solution was added about 4 cc of the initiator prepared as described hereinabove. Polymerization was allowed to continue for about 3 hours at about 50° C., after which the reaction was terminated by the addition of about 1 cc of ethanol. About 98 grams of the polymer were obtained after drying. Analysis revealed that the polybutadiene polymer, Polymer 1, had a molecular weight of 73,300, a $\overline{M}w/\overline{M}n=1.21$, and 0.006 percent nitrogen. A GPC scan showed a strong ultraviolet absorption, indicating the presence of the dimethylamino phenyl group on substantially all of the polymer chains.

EXAMPLES NO. 2, 3

To a suitable vessel was charged 1991 grams of 33 percent styrene in hexane, 6917 grams of 24.5 percent butadiene in hexane, 1370 grams of hexane and 52 cc of 0.5M solution of the initiator in THF, prepared as described hereinabove. Polymerization was continued for about 3 hours at about 50° C., and then 4876 grams of the solution was removed, terminated with isopropyl alcohol containing DBPC and drum dried to produce Polymer 2. The remaining half of the batch was end-capped by adding 2.80 cc of 3.69M tributyl tin chloride. After stirring for an hour to assure complete reaction, the polymer was mixed with isopropyl alcohol containing DBPC, followed by drum drying to yield Polymer 3. Analysis of the polymers revealed a molecular weight of 164,000, $\overline{M}w/\overline{M}n=1.50$ and 28.2 percent styrene. The polybutadiene component comprised 23.6 percent cis; 43.0 percent trans; 33.5 percent vinyl; by IR. NMR showed 29.7 percent styrene, which was 7.1 percent block, while the polybutadiene comprised 34.6 percent vinyl. Nitrogen content was 0.006 percent.

EXAMPLE NO. 4

A SBR Control was prepared by charging to a suitable vessel, 2295 grams of 33 percent styrene in hexane and 7983 grams of 24.5 percent butadiene with 16.8 cc of 1.5M n-butyl lithium in hexane. Polmerization was allowed to proceed for about 3 hours at 50° C., after which the reaction was terminated with about 1 cc of isopropyl alcohol. The resulting SBR compound, Polymer 4, was found to have a molecular weight of 154,000; $\overline{M}w/\overline{M}n=1.57$ and 28.2 percent styrene. The polybutadiene portion comprised 27.6 percent cis; 47.3 percent trans; and 25.1 percent vinyl.

COMPOUNDING TESTS

Three separate compounds were prepared employing Polymer Nos. 2, 3 and 4, prepared as described hereinabove. To 100 parts of each polymer there was added 50 parts of N-339 carbon black, 3 parts of zinc oxide, 1 part of an antioxidant, 1.8 parts of sulfur, 2 parts of stearic acid, and 1 part of Santocure NS. Each of these compounds was cured for about 35 minutes at 148° C., and then tested for rebound, Shore A hardness, ring tear, and tangent delta. The change in tangent delta of Polymers 2 and 3 was also determined as compared to the control Polymer 4. As is known in the art, the lower the tangent delta number, the greater is the reduction in hysteresis properties of the compound. Test data for the three compounds is reported in TABLE II hereinbelow.

TABLE II

| Compound Containing Polymer No. | | 2 | 3 | 4 |
|---|---|---|---|---|
| Tensile (lbs/in$^2$) | | 2943 | 2948 | 3428 |
| Elongation (%) | | 330 | 307 | 346 |
| Rebound | 24° C. | 45.4 | 47.2 | 48.2 |
|  | 65° C. | 64.2 | 67.2 | 55.6 |
| Shore A | | 71 | 71 | 84 |
| Ring Tear | 23° C. | 309 | 277 | 326 |
| (lbs.in) | 71° C. | 121 | 111 | 168 |
| Tan δ | 24° C. | .1570 | .1369 | .1829 |
|  | 65° C. | .1059 | .08978 | .1689 |
| Δ Tan δ | 24° C. | −14.2% | −25.2% | — |
|  | 65° C. | −37.3% | −46.8% | — |

It can readily be noted that the compounds containing Polymers 2 and 3 prepared with an initiator of the present invention showed a favorable improvement in hysteresis.

In conclusion, it should be clear from the foregoing examples and specification disclosure that the initiators of the present invention are useful for the anionic polymerization of diene monomers to form homopolymers as well as copolymers with monovinyl aromatic polymers or trienes. The resulting elastomeric polymers have a functional group at the site of initiation and a lithium atom at the terminal, "living" end. After quenching, the polymers still retain the functional group at the site of initiation, which promotes uniform and homogeneous mixing with carbon black. As a result vulcanizable elastomeric compounds containing these polymers exhibit improved hysteresis which provides lower rolling resistance in tires and improved fuel economy. Additionally, the lithium terminated polymers can be quenched with compounds to provide terminal functional groups and hence, difunctional polymer chains.

It is to be understood that the invention is not limited to the specific reactants, initiators, and organolithium compounds disclosed nor to any particular modifier or solvent. Similarly, the examples have been provided merely to demonstrate practice of the subject invention and do not constitute limitations of the invention. Those skilled in the art may readily select other monomers and process conditions, according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A method of preparing an anionic polymerization initiator comprising the step of:

reacting an organolithium compound with a phenylamine compound by forming a solution comprising from about 0.9 to about 1.1 moles of said phenylamine compound per 1 mole of said organolithium compound in an anhydrous aprotic solvent, wherein said phenylamine compound is selected from the group consisting of

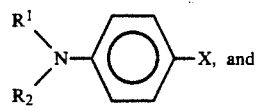

-continued

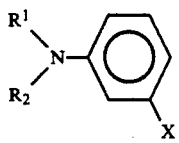

where $R^1$ and $R^2$ are the same or different and are selected from the group consisting of alkyls having from 1 to about 12 carbon atoms, cycloalkyls having from 3 to about 14 carbon atoms, and aryls having from 6 to about 20 carbon atoms; and X is a halogen, wherein X is replaced by a lithium atom.

2. A method of preparing an anionic polymerization initiator, as set forth in claim 1, wherein said organolithium compound has the general formula RLi, where R is selected from the group consisting of alkyls, cycloalkyls, alkenyls, alkynyls, aryls and aralkyls having from about 1 to about 20 carbon atoms and short chain length low molecular weight polymers from diolefin and vinyl aryl monomers having up to about 25 units.

3. A method of preparing an anionic polymerization initiator, as set forth in claim 2, wherein said organolithium compound is n-butyl lithium.

4. A method of preparing an anionic polymerization initiator, as set forth in claim 1, wherein $R^1$ and $R^2$ are methyl groups.

5. A method of preparing an anionic polymerization initiator, as set forth in claim 1, wherein X is bromine.

6. A method of preparing an anionic polymerization initiator, as set forth in claim 1, including the additional step of isolating precipitated initiator from said solvent.

7. A method of preparing an anionic polymerization initiator, as set forth in claim 6, including the additional step of dissolving said precipitate in an anhydrous polar, aprotic solvent.

8. A method of preparing an anionic polymerization initiator, as set forth in claim 7, wherein said anhydrous polar, aprotic solvent is selected from the group consisting of tetrahydrofuran, tertiary amines and ethers.

* * * * *